United States Patent [19]

Lear et al.

[11] Patent Number: 5,661,212

[45] Date of Patent: Aug. 26, 1997

[54] METHOD OF PROVIDING A COATING COMPOSITION ON ALKYD-COATING AND THE RESULTING COATED PRODUCT

[75] Inventors: Peter Lear, Cambridge, Mass.; Hendricus Cornelis Goos, Dorst, Netherlands; Gerardus Cornelis Overbeek, Waalwijk, Netherlands; Emile Johannes Maria Stevens, Tilburg, Netherlands

[73] Assignee: Zeneca Resins BV, Waalwijk, Netherlands

[21] Appl. No.: 411,786

[22] PCT Filed: Sep. 17, 1993

[86] PCT No.: PCT/GB93/01964

§ 371 Date: Apr. 7, 1995

§ 102(e) Date: Apr. 7, 1995

[87] PCT Pub. No.: WO94/09045

PCT Pub. Date: Apr. 28, 1994

[30] Foreign Application Priority Data

Oct. 9, 1992 [GB] United Kingdom ............... 9221222

[51] Int. Cl.$^6$ ............... C08L 39/00; C08F 12/28; B05D 3/02; B05B 5/14
[52] U.S. Cl. ............... 524/521; 524/555; 526/317; 427/393.5; 427/482; 427/483
[58] Field of Search ............... 524/521, 555; 526/310; 427/393.5; 428/482, 483

[56] References Cited

U.S. PATENT DOCUMENTS

| 3,985,698 | 10/1976 | Matsudaira | 524/521 |
| 4,166,882 | 9/1979 | Das et al. | 428/463 |
| 4,418,175 | 11/1983 | Probst et al. | 524/555 |
| 4,760,110 | 7/1988 | Das | 524/521 |
| 4,988,762 | 1/1991 | Overbeek et al. | 526/310 |
| 5,002,998 | 3/1991 | Carey et al. | 524/555 |

FOREIGN PATENT DOCUMENTS

| 290777 | 11/1988 | European Pat. Off. . | |
| 0322188 | 6/1989 | European Pat. Off. | 524/555 |
| 0326723 | 8/1989 | European Pat. Off. . | |
| 0341886 | 11/1989 | European Pat. Off. . | |
| 0483915 | 5/1992 | European Pat. Off. . | |
| 0085844 | 5/1982 | Japan | 524/555 |
| 2047171 | 2/1990 | Japan . | |
| 1541909 | 3/1979 | United Kingdom . | |
| 90 15086 | 12/1990 | WIPO . | |

OTHER PUBLICATIONS

Ronald W.Kreis, Ph.D, "Development of a Ureido Functional Monomer for Promoting Wet Adhesion in Latex Paints", University of Southern Mississippi, 1988, pp. 222–242.

*Primary Examiner*—Peter A. Szekely
*Attorney, Agent, or Firm*—Cushman Darby & Cushman IP Group Pillsbury Madison & Sutro LLP

[57] ABSTRACT

Coating composition comprising a liquid carrier-based dispersion of at least one olefinic addition polymer, said dispersion of polymer(s) providing polymer bound tertiary amino groups and polymer bound acetoacetyl groups.

The compositions are suitable for providing protective or decorative coatings for a range of substrates and have excellent adhesion and wet adhesion properties.

The olefinic addition polymers having polymer bound amino and acetoacetyl groups are also claimed.

20 Claims, No Drawings

METHOD OF PROVIDING A COATING COMPOSITION ON ALKYD-COATING AND THE RESULTING COATED PRODUCT

This invention relates to coating compositions and in particular to aqueous coating compositions containing certain olefinic addition polymers and to certain novel olefinic addition polymers for use therein.

The provision of polymeric film coatings for use on a variety of substrates, usually for protective and/or decorative purposes, is well known. Film coatings which are intended for use in moist or humid conditions, such as for outdoor use or in kitchens or bathrooms or in applications where resistance to repeated washing is a requirement, must have good wet adhesion i.e. the polymeric film coating must retain its adhesive bond to the substrate under damp conditions.

Coating compositions are known, from EP 0 341 886, which comprise olefinic addition polymers having chain-pendant primary and/or secondary amine and chain-pendant carbonyl functionalites but these suffer from the disadvantage that they cause strong yellowing of not only overcoated alkyd-containing films but of any alkyd-containing films in the vicinity. Polymers which incorporate tertiary amine monomers such as dimethylamino ethylmethacrylate (DMAEMA) are known from EP 0290777 and have been used in coating compositions and provide moderate wet adhesion without noticeable alkyd yellowing at levels of 3–7% but higher levels of up to 15% are required to match the performance of market leading compositions. However, at these higher levels the film forming properties of the composition are inadequate requiring the addition of plasticisers, which causes total loss of adhesion, or requiring the addition of solvents which produces an environmentally undesirable increase in the volatile organics content.

We have now found that polymeric films which have good wet adhesion properties and do not cause yellowing in adjacent or nearby alkyd-containing coatings and which additionally have good antiblocking properties and low minimum film forming temperatures (MFFT) may be obtained from polymer compositions which have tertiary amino and acetoacetyl functionality.

According to the present invention there is provided a coating composition comprising a liquid carrier-based dispersion of at least one olefinic addition polymer, said dispersion of polymer(s) providing polymer bound tertiary amino groups and polymer bound acetoacetyl groups.

The dispersion may be a dispersion of said polymer(s) in at least one organic liquid, in water, or in a combination of water and at least one organic liquid. Suitable organic liquids may be selected from glycols such as ethylene glycol, propylene glycol and butylene glycol, alkoxylated glycols such as propoxylated ethyleneglycol and propylene glycol, and ethoxylated butylene glycol, aliphatic hydrocarbons such as hexane, aromatic hydrocarbons such as xylene, esters such as ethyl acetate and ethyl butyrate, ethers such as diethylether and tetrahydrofuran, alcohols such as propanol and butanol, ketones such as methylisobutylketone, and nitroalkanes such as nitropropane.

The dispersion of said polymer(s) is preferably an aqueous dispersion and for the purposes of the present invention the term 'aqueous dispersion' means a dispersion of the olefinic addition polymer(s) in a liquid carrier in which water is the principal component at equal to or greater than 50% by weight of the liquid carrier, and preferably at equal to or greater than 80% by weight of the liquid carrier. Minor amounts of organic liquids may optionally be present. The aqueous dispersion is preferably an aqueous latex of the olefinic addition polymer(s). The aqueous dispersion may optionally further comprise materials which aid film coalescence, examples of which are given in the list of organic liquids described above.

By an olefinic addition polymer is meant an addition polymer derived from the polymerisation of one or more olefinically unsaturated monomers.

The dispersion of polymer(s) in the composition of the invention provides a polymer system having polymer bound tertiary amino groups and polymer bound acetoacetyl groups. Such amino and acetoacetyl groups can be present in molecules of the same polymer (i.e. one polymer providing molecules with both tertiary amino and acetoacetyl groups) and/or each type of group can be present without the other in molecules of different polymers (i.e. one polymer providing molecules with tertiary amino group but not acetoacetyl groups and another polymer providing molecules with acetoacetyl groups but not tertiary amino groups).

Therefore an olefinic addition polymer that can be used for the purposes of the invention may be derived from the copolymerisation of an olefinically unsaturated monomer(s) bearing a tertiary amino group and/or an olefinically unsaturated monomer(s) bearing an acetoacetyl group together with an olefinically unsaturated monomer(s) bearing neither tertiary amino nor acetoacetyl groups.

Suitable olefinically unsaturated monomers which bear tertiary amino groups include dialkylaminoalkylacrylates, dialkylaminoalkylmethacrylates, dialkylaminoacrylamides, dialkylaminomethacrylamides and dialkylaminoalkyl-acrylates and -methacrylates in which the dialkyl groups together with the —N— atom to which they are attached form a 5-, 6- or 7-membered heterocyclic ring which may optionally contain additional hetero atoms such as —N—, —O— and —S— in the ring. The alkyl groups in any of the above acrylates, methacrylates, acrylamides and methacrylamides are preferably each independently $C_{1-10}$-alkyl groups and more preferably $C_{1-6}$-alkyl groups and especially $C_{1-4}$-alkyl groups each of which may be straight or branched chain.

The unsaturated olefinic monomers which bear tertiary amino groups are preferably di-($C_{1-4}$-alkyl)amino-$C_{1-4}$-alkyl acrylates, more preferably dimethylaminoethylacrylate and diethyl aminoethylacrylate; di-($C_{1-4}$-alkyl)amino-$C_{1-4}$-alkyl methacrylates, more preferably dimethyl aminoethylmethacrylate, diethylamino ethylmethacrylate and di-t-butylaminoethyl methacrylate; di-($C_{1-4}$-alkyl)amino-$C_{1-4}$-alkyl acryl amides, more preferably dimethylaminopropylacrylamide; di-($C_{1-4}$-alkyl)amino-$C_{1-4}$-alkylmethacrylamides, and di-($C_{1-4}$-alkyl)amino-$C_{1-4}$-alkyl-acrylates and methacrylates in which the dialkyl groups form a 5-, 6- or 7-membered heterocyclic ring, more preferably oxazolidinoethyl methacrylate. Especially preferred unsaturated olefinic monomers which bear tertiary amino groups are dimethylaminoethylacrylate and dimethylaminoethylmethacrylate.

By an acetoacetyl group in this specification is meant a group having the Formula (1):

(1)

where the methyl group may optionally be mono, di or tri-substituted and the methylene group may optionally be monosubstituted, provided any substitution does not impair the effectiveness of the acetoacetyl group to act in accordance with the objective of the present invention. Such an acetoacetyl group will normally be provided in the environment of an acetoacetate grouping of Formula (2):

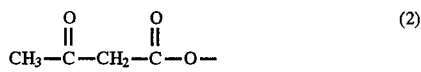 (2)

or an acetoacetamide grouping of Formula (3):

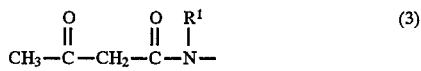 (3)

or a 1,3-diketone grouping of Formula (4):

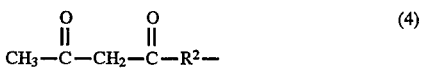 (4)

where $R^1$ is hydrogen or a monovalent hydrocarbyl radical such as an alkyl, aryl, aralkyl or alkaryl radical each of which may be optionally substituted and $R^2$ is a divalent hydrocarbyl radical such as an alkylene, arylene, aralkylene or alkarylene radical each of which may be optionally substituted and the methyl and methylene groups may optionally be substituted as described above.

Where $R^1$ is alkyl or includes alkyl in aralkyl or alkaryl radicals it is preferably $C_{1-10}$-alkyl and more preferably $C_{1-6}$-alkyl. Where $R^1$ is aryl or includes aryl in aralkyl or alkaryl radicals it is preferably phenyl. The arylene part of the radicals represents by $R^2$ is preferably phenylene. Where $R^2$ is alkylene or includes alkylene in aralkylene it is preferably $C_{1-20}$-alkylene and more preferably $C_{1-10}$-alkylene. Where $R^2$ includes aryl in aralkylene it is preferably phenyl. $R^1$ and $R^2$ may be a straight or branched chain alkyl or alkylene radicals respectively.

It is preferred, however, that the acetoacetyl group is provided by an acetoacetate or acetoacetamide group.

Suitable optional substituents for the groups represented by $R^1$ and $R^2$ and for the methyl or methylene groups of Formulae (1) to (4) may be selected from —CN, $C_{1-4}$-alkoxy, phenyl, halogen such as —F, —Cl and —Br and $C_{1-4}$-alkyl.

Suitable olefinically unsaturated monomers which bear acetoacetyl groups include acetoacetic acid esters and amides of hydroxyalkylacrylates, hydroxyalkylmethacrylates and hydroxy alkenes. The alkyl group in any of the hydroxyalkyl-acrylates or -methacrylates is preferably a $C_{1-10}$-alkyl and more preferably a $C_{1-5}$-alkyl group each of which may be a straight or branched chain. The alkene group in the hydroxyalkene is preferably a $C_{2-10}$-alkene, more preferably a $C_{2-6}$-alkene and especially a $C_3$-alkene group.

Preferred olefinically unsaturated monomers bearing acetoacetyl groups include acetoacetic acid esters and amides of hydroxymethylacrylate, hydroxethylacrylate, hydroxypropylacrylate, hydroxymethylmethacrylate, hydroxyethylmethacrylate, hydroxypropyl methacrylate, and allyl alcohol. Especially preferred olefinically unsaturated monomers bearing acetoacetyl groups are acetoacetoxy ethylmethacrylate and allylacetoacetamide.

Suitable olefinically unsaturated monomers which bear neither tertiary amino nor acetoacetyl groups include olefinically unsaturated mono- or di-carboxylic acids, their anhydrides, their esters of mono-, di- or poly-functional hydroxyl compounds, their amides and their nitriles; dienes; vinylaromatics; vinylhalides; vinylesters; vinylsilanes and vinylheteroaromatics (none of which of course should bear tertiary amino or aceracetyl groups). Preferred olefinically unsaturated mono- or di-carboxylic acids and their anhydrides include acrylic, methacrylic, maleic and itaconic acids and their anhydrides. Preferred esters of olefinically unsaturated mono- or di-carboxylic acids include methyl acrylate, ethyl acrylate, hydroxyethyl acrylate, n-propyl acrylate, hydroxypropyl acrylate, n-butyl acrylate, 2-ethylhexyl acrylate, isobornyl acrylate, methylmethacrylate, ethylmethacrylate, hydroxyethylmethacrylate, n-propylmethacrylate, hydroxypropylmethacrylate, n-butyl methacrylate, 2-ethylhexymethacrylate and isobornylmethacrylate. Especially preferred olefinically unsaturated mono- or di-carboxylic acids or their esters are methacrylic acid, n-butyl acrylate, n-butyl methacrylate, methylmethacrylate. Preferred amides and nitriles of olefinically unsaturated mono- or di-carboxylic acids include acrylamide, methacrylamide, acrylonitrile and methacrylonitrile. Preferred dienes include 1,3-butadiene, isoprene, chloroprene, styrene, α-methylstyrene and divinylbenzene. Preferred vinylaromatics include vinyltoluene. Preferred vinylhalides include vinylchloride and vinylidene chloride. Preferred vinylesters include vinylacetate, vinylpropionate and vinyllaurate. Preferred vinylsilanes include vinyltrimethoxy silane. Preferred vinylheteroaromatics include vinylpyridine.

An olefinic addition polymer used in the composition of the invention may optionally include acid repeat units as indicated above; such units may be incorporated by employing an olefinically unsaturated carboxylic acid monomer in the copolymerisation to form it. The presence of such acid units in the polymer is advantageous particularly where the polymer is formulated for example into decorative paints where the acid units contribute to the adhesion of the paint to the substrate being painted, act as a pigment wetting agent and provide a site for cross-linking. Suitable olefinically unsaturated acid monomers are α,β-ethylenically unsaturated carboxylic acids such as acrylic and alkylacrylic acids where the alkyl group is preferably $C_{1-4}$-alkyl. A preferred olefinically unsaturated acid monomer is methacrylic acid.

In the olefinic addition polymer(s) the tertiary amino and acetoacetyl groups are predominantly chain pendant groups although each type of group may also occupy terminal positions in the polymer.

It will be appreciated that the present invention can be realised in several embodiments in which the acetoxy and tertiary amine monomer units may be part of the same or different polymer chains as described below.

In a first embodiment of the present invention the composition comprises at least one olefinic addition polymer having molecules with both polymer bound tertiary amino and polymer bound acetoacetyl groups.

In a second embodiment of the present invention the composition comprises at least one olefinic addition polymer having molecules with polymer bound tertiary amino groups but is free from molecules with acetoacetyl groups and at least one olefinic addition polymer having molecules with polymer bound acetoacetyl groups but is free from molecules with tertiary amino groups.

In a third embodiment of the present invention the composition comprises at least one olefinic addition polymer having molecules with both polymer bound tertiary amino and polymer bound acetoacetyl groups and at least one olefinic addition polymer which has molecules with polymer bound tertiary amino groups but is free from molecules with acetoacetyl groups.

In a fourth embodiment of the present invention the composition comprises at least one olefinic addition polymer having molecules with both polymer bound tertiary amino and polymer bound acetoacetyl groups and at least one olefinic addition polymer which has molecules with polymer bound acetoacetyl groups but is free from molecules with tertiary amino groups.

In the tertiary amino-functional olefinic addition polymers, whether or not they are also acetoacetyl functional, the level of tertiary amino functionality is preferably that corresponding to the use of from 1 to 25% w/w and more preferably from 5 to 20% w/w of tertiary amino-functional monomer(s) based on the total weight of monomers employed in the polymerisation. In the acetoacetyl functional polymers, whether or not they are also tertiary amino functional, the level of acetoacetyl functionality is preferably that corresponding to the use of from 0.5 to 30% w/w, and more preferably from 1 to 15% w/w of acetoacetyl functional monomer(s) based on the total weight of monomers employed in the polymerisation. The ratio of acetoacetyl functionality to tertiary amino functionality in the composition, is preferably from 1:20 to 6:1 and more preferably from 1:8 to 3:1.

Where an olefinic addition polymer includes units of an olefinically unsaturated acid monomer the level of acid monomer units is preferably that corresponding to the use of from 0.1 to 10% w/w and more preferably from 0.5 to 5% w/w of the acid monomer(s) based on the total weight of monomers employed in the polymerisation, the ratio of acid monomer to the amino functional monomer is preferably from 1:1 to 1:25, more preferably from 1:8 to 1:18 by weight, and the ratio of the acid monomer to the acetoacetyl functional monomer is preferably from 5:1 to 1:25 and more preferably from 1:1 to 1:15.

The compositions of the present invention are suitable for providing protective or decorative coatings with excellent adhesion and wet adhesion properties, which have good antiblocking properties, low MFFTs and which do not cause yellowing when used to overcoat alkyd substrates and are suitable for use on a range of substrates such as wood, metal, plaster, plastics, textile materials, alkyd painted surfaces, leather, paper either as a dispersion of the olefinic addition polymer in an aqueous or an organic medium or in a combination of aqueous and organic media or after formulation.

The compositions of the present invention may also incorporate for example plasticisers, preservatives such as anti fungal agents, thickening agents, anti-foaming agents, stabilisers such as ionic, non-ionic and colloidal surfactants, pigments, dyes, solvents, emulsifiers, fillers, antioxidants and the like.

The compositions of the invention may be applied to the various substrates by any conventional method such as spraying, brushing, flow coating and dipping.

It is believed that the olefinic addition polymers, which bear both tertiary amino and acetoacetyl groups referred to above are novel and patentable in their own right. Therefore, according to a further feature of the present invention there is provided an olefinic addition polymer having molecules with both tertiary amino groups and acetoacetyl groups. Such an olefinic addition polymer may be derived as described above by copolymerising an olefinically unsaturated monomer(s) which bears a tertiary amino group and an olefinically unsaturated monomer(s) which bears an acetoacetyl group and including in the copolymerisation an olefinically unsaturated monomer(s) which bears neither tertiary amino nor acetoacetyl groups, such as an olefinically unsaturated acid monomer(s).

The olefinic addition polymers used for the present invention may be prepared by a one stage or a two stage process. For example, in a one stage process, copolymerisation of an olefinically unsaturated monomer(s) which bears an acetoacetyl group and an olefinically unsaturated monomer(s) which bears a tertiary amino group together with an olefinically unsaturated monomer(s) bearing neither functionality forms an olefinic addition polymer having both acetoacetyl and tertiary amino groups and polymerisation is effected in a single stage form particles of an essentially single polymer phase. Similarly, a one stage copolymerisation of olefinically unsaturated monomer(s) bearing only acetoacetyl groups or only tertiary amino groups together with olefinically unsaturated monomer(s) bearing neither functionality forms an olefinic addition polymer having either acetoacetyl groups or tertiary amino groups respectively.

In a two stage process polymerisation is effected in two sequential stages to produce polymer phases differing in some desired property—such as glass transition temperature (Tg). For example, a first polymerisation stage may be effected as described above, and the monomers may be chosen such that an olefinic addition polymer phase with a relatively low glass transition temperature (Tg) is formed first, and then a second stage of polymerisation effected where the monomers are chosen such that an olefinic addition polymer phase with a relatively high Tg is obtained. The structure of the polymer particles from such a process are often of a core/shell nature, in which a shell of the second stage polymer phase surrounds a core of the first stage polymer phase. Alternatively the monomers may be chosen such that an olefinic addition polymer phase with a relatively high Tg is formed first and in the second stage the monomers are chosen such that an olefinic addition polymer with a relatively low Tg is obtained and this second stage polymer phase forms of a shell round a core of the first stage phase.

The one or two stage process may be performed in a liquid medium such as water and the reaction mixture may contain surfactants and additives such as aqueous ammonia to control/adjust the pH.

The invention is further illustrated by the following examples in which all parts and percentages are by weight.

EXAMPLE 1

Composition of a one stage olefinic addition polymer bearing acetoacetyl and tertiary amino groups.

A monomer feed was prepared which comprised demineralised water (236.9 parts), 30% aqueous sodium lauryl sulphate (58.4 parts) and methacrylic acid (6.6 parts) pH adjusted to 9.0–9.5 with 25% aqueous ammonia (5.8 parts) before adding n-butyl methacrylate (381.4 parts), n-butyl acrylate (96.7 parts), methylmethacrylate (34.3 parts), dimethylaminoethylmethacrylate (98.6 parts) and acetacetoxyethylmethacrylate (39.4 parts) and mixing until a stable pre-emulsion is formed.

A catalyst feed was prepared which comprised ammonium persulphate (3.3 parts) and water (62.4 parts).

A mixture of demineralised water (629.5 parts) and 30% aqueous sodium lauryl sulphate (29.1 parts) was adjusted to pH 9.0–9.5 with 25% aqueous ammonia (0.6 parts) and 10% of the monomer feed and 10% of the catalyst feed were added and heated to 88° C. in an efficiently stirred reaction vessel, the rest of the monomer and catalyst feeds were fed simultaneously to the reaction vessel at such rates that the monomer feed was completed after 60 minutes and the catalyst feed was completed after 70 minutes. The reaction mixture was stirred for a further 30 minutes at 88°±2° C. before cooling and recovering the product.

EXAMPLE 2

Composition of a one stage olefinic addition polymer bearing acetoacetyl and tertiary amine groups.

A monomer feed was prepared which comprised demineralised water (250.0 parts), 20% aqueous Surfageen FAZ 109V (40.0 parts Surfageen FAZ is a trade mark) and methacrylic acid (18.0 parts) pH adjusted to 9.0–9.5 with 25% aqueous ammonia (20.0 parts) before adding n-butylmethacrylate (366.0 parts), n-butyl acrylate (50.0 parts), methylmethacrylate (60.0 parts), diethyl aminoethylmethacrylate (60.0 parts) and acetoacetoxyethyl methacrylate (36.0 parts) and mixing until a stable pre-emulsion was formed.

A catalyst feed was prepared which comprised ammonium persulphate (3.0 parts) and demineralised water (97.0 parts). A mixture of demineralised water (430.5 parts) and Surfageen FAZ 109V (80.0 parts) was pH adjusted to 9.0–9.5 with 25% aqueous ammonia (7.5 parts) and 10% of the monomer feed and 10% of the catalyst feed were added and heated to 88° C. in an efficiently stirred reaction vessel, the rest of the monomer and catalyst feeds were fed simultaneously to the reaction vessel at such rates that the monomer feed was completed after 60 minutes and the catalyst feed was completed after 70 minutes. The reaction mixture was stirred for a further 30 minutes at 88°±2° C. before cooling and recovering the product.

EXAMPLE 3

Composition of a two stage olefinic addition polymer bearing acetoacetyl and tertiary amine groups.

Monomer feed 1 was prepared which comprised demineralised water (165.8 parts), 20% aqueous Surfageen FAZ 109V (46.0 parts) and methacrylic acid (4.6 parts) pH adjusted to 9.0–9.5 with 25% aqueous ammonia (7.4 parts) before adding n-butyl acrylate (122.4 parts), n-butyl methacrylate (236.4 parts), dimethylaminoethylmethacrylate (69.0 parts), and acetoacetoxy ethylmethacrylate (27.6 parts).

Monomer feed 2 was prepared which comprised demineralised water (71.1 parts), Surfageen FAZ 109V (19.7 parts) and methacrylic acid (2.0 parts) pH adjusted to 9.0–9.5 with 25% aqueous ammonia (3.4 parts) before adding n-butylmethacrylate (50.7 parts), methylmethacrylate (103.0 parts), dimethylaminoethyl methacrylate (29.6 parts) and acetoacetoxyethylmethacrylate (11.8 parts). A catalyst feed was prepared which comprised ammonium persulphate (3.3 parts) and demineralised water (62.4 parts).

A mixture of demineralised water (626.3 parts) and 20% aqueous Surfageen FAZ 109V (32.8 parts) was adjusted to pH 9.0–9.5 with 25% aqueous ammonia (4.7 parts) and 10% of Monomer feed 1 and 10% of the catalyst feed were added and heated to 88° C. in an efficiently stirred reaction vessel, Monomer feed 1 and the catalyst feed were fed to the reaction vessel simultaneously at such a rate that the Monomer feed 1 was completed in 70 minutes whereupon Monomer feed 2 was fed simultaneously with the catalyst feed at such a rate that the Monomer feed 2 was completed in 30 minutes. The catalyst feed was completed in a total of 110 minutes. The reaction mixture was stirred for a further 30 minutes at 88°±2° C. before cooling and recovering the product.

EXAMPLE 4—COMPARATIVE

Composition of a one stage olefinic addition polymer bearing acetoacetyl groups but no tertiary amino groups.

A monomer feed was prepared which comprised demineralised water (236.9 parts), 20% aqueous Surfageen FAZ 109V (65.7 parts) and methacrylic acid (6.6 parts) pH adjusted to 9.0–9.5 with 25% aqueous ammonia (9.8 parts) before adding n-butyl methacrylate (453.3 parts), methylmethacrylate (41.1 parts), n-butyl acrylate (77.2 parts) and acetoacetoxyethylmethacrylate (78.8 parts) and mixing until a stable pre-emulsion was formed. A catalyst feed was prepared which comprised ammonium persulphate (3.3 parts) and demineralised water (62.4 parts).

A mixture of demineralised water (641.9 parts) and 20% aqueous Surfageen FAZ 109V (32.9 parts) was adjusted to pH 9.0–9.5 with 25% aqueous ammonia (2.6 parts) and 10% of the monomer feed and 10% of the catalyst feed were heated to 88° C. in an efficiently stirred reaction vessel, the rest of the monomer and catalyst feeds were fed simultaneously to the reaction vessel at such rates that the monomer feed was completed after 60 minutes and the catalyst feed was completed after 70 minutes. The reaction mixture was stirred for a further 30 minutes at 88°±2° C. before cooling and recovering the product.

EXAMPLE 5—COMPARATIVE

Composition of a one stage olefinic addition polymer bearing tertiary amino groups but no acetoacetyl groups.

The procedure of Example 4 was followed except that in the monomer feed 9.9 parts instead of 41.1 parts of methyl methacrylate, 55.8 parts instead of 77.2 parts of n-butyl methacrylate, and dimethylaminoethylmethacrylate (131.4 parts) instead of the acetoacetoxyethylmethacrylate were used.

EXAMPLE 6

A composition according to the invention was prepared by making a physical blend comprising 50% by weight of the product from Example 4 and 50% by weight of the product from Example 5. The composition was subjected to the tests described below.

Formulation 1

The product from Example 1 was formulated into a high gloss brushable paint before assessing its wet adhesion, blocking and yellowing properties, the components of the formulation in which all parts are by weight is listed below:

| | | Parts |
|---|---|---|
| 1. | Propylene glycol | 2.4 |
| 2. | Water | 3.3 |
| 3. | AMP-95 (neutraliser from IMC) | 0.2 |
| 4. | Dehydran 1293 (defoamer from Henkel) | 0.5 |
| 5. | Surfynol 104E (wetting agent from Air Products) | 0.4 |
| 6. | Neocryl BT-24 (grinding medium from ICI Resins B.V.) | 3.1 |
| 7. | Titanium dioxide TR-92 (pigment from Tioxide) | 24.0 |
| 8. | Product from Example 1 | 59.2 |
| 9. | Ethyl diglycol | 4.3 |
| 10. | Tafigel PUR 40 (thickener from Münzing Chemie) | 1.1 |
| 11. | Dehydran 1293 | 1.5 |

Components 1–7 were mixed and dispersed in a Cowless dissolver, Components 8–11 were added in order whilst stirring. Stirring was continued until a sample transferred to a glass plate produced a crater-free film.

Formulations 2–6

Formulations 2–6 were identical to that described in Formulation 1 except that products from Examples 2–6 respectively were used in place of the product from Example 1.

The performance of the formulations was assessed using the following tests:

i) Wet Adhesion Testing

Wet adhesion was assessed by a modified Gitterschnitt test. The substrate is a commercial alkyd prepared as follows:

A commercial long oil alkyd paint was sprayed onto wooden boards so as to give a smooth surface. The paint was allowed to dry for 1 day at ambient temperature before placing the painted board in an oven at 50° C. for 14 days in order to simulate long term ageing. The boards were then ready for use.

The olefinic addition polymer formulation was applied by brush at an approximate thickness of 100 μm and allowed to dry thoroughly at ambient temperature (approximately 4 hours) before ageing for 16 hours at 50° C. The coating was allowed to cool for two hours, whereupon a wad of cotton wool soaked in deionised water was placed on the coating and maintained in a saturated state for 4 hours. The wad was removed, the coating dried with tissue and a series of cuts made in the coating such that 100 squares 1 mm$^2$ are formed. A standard cellulosic tape is then pressed smoothly and evenly onto this and then jerked sharply away at an angle of 180°. The coating was inspected for damage. In the table below Gt-0 indicates no loss of coating from the alkyd surface and Gt-5 complete loss of coating from the alkyd surface.

Blocking Test

A coating (75 μm wet) of the olefinic addition polymer formulation was made on a special test chart of coated cardboard (form 8b, supplied by Leneta Co. U.S.A.).

The coating was allowed to become touch dry before being aged at 50° C. for 16 hours. After cooling for two hours two pieces were cut from the chart and placed together so that the olefinic addition polymer was face to face. This was then placed under a pressure of 1 kgcm$^{-2}$ (Koehler block tester) for 4 hours at 50° C., before cooling and separating the two coated pieces. The degree to which the pieces have adhered together was assessed, and the following grades: Completely non-adhered: ++; +; +/0; 0/−; −; — Completely welded together, are used in the table below.

Yellowing

The alkyd board and the olefinic addition polymer coating formulation were prepared and dried in the same way as for the wet adhesion test. White alkyd was used. The prepared test panel of alkyd and acrylic coating was then aged for 30 days at 50° C., after which time the alkyd was inspected for yellowing. As a comparison, a panel of alkyd only (no olefinic addition polymer formulation coating) was awarded a score of 5 and a panel coated with a latex known to give strong alkyd yellowing awarded at 0.

The results of the above tests are tabulated below:

|  | Wet adhesion | Blocking | Yellowing |
| --- | --- | --- | --- |
| Example 1 | Gt-0 | ++ | 5 |
| Example 2 | Gt-0 | + | 3 |
| Example 3 | Gt-0 | ++ | 5 |
| Comparative Example 4 | Gt-5 | + |  |
| Comparative Example 5 | Gt-0 | — | 5 |
| Example 6 | Gt-2 | + |  |

We claim:

1. In a method of providing a coating composition on an alkyd-containing coating, the improvement which comprises using, as said coating composition, one comprising a dispersion in a liquid carrier of at least one olefinic addition polymer, said dispersion of polymer(s) providing polymer bound tertiary amino groups and polymer bound acetoacetyl groups.

2. Method according to claim 1 wherein the dispersion is in a liquid carrier which comprises at least 50% by weight of water.

3. Method according to claim 1 or claim 2 wherein the dispersion is in a liquid carrier which comprises at least 80% by weight of water.

4. Method according to claim 1 wherein the olefinic addition polymer is derived from a copolymerisation of an olefinically unsaturated monomer, selected from the group consisting of unsaturated monomers bearing a tertiary amino group and olefinically unsaturated monomers bearing an acetoacetyl group with at least one olefinically unsaturated monomer bearing neither tertiary amino nor acetoacetyl groups.

5. Method according to claim 4 wherein the olefinically unsaturated monomer bearing a tertiary amino group is selected from the group consisting of a dialkylaminoalkylacrylate, a dialkylaminoalkyl methacrylate, a dialkylaminoacrylamide, a dialkylaminomethacrylamide, a dialkylaminoalkylacrylate and a dialkylaminoalkyl methacrylate in which the dialkyl groups together with the —N— atom to which they are attached form a 5-, 6- or 7-membered heterocyclic ring.

6. Method according to claim 5 wherein in the olefinically unsaturated monomer(s) bearing an acetoacetyl group the acetoacetyl group is of Formula (1):

7. Method according to claim 1 wherein the acetoacetyl group is provided in the environment of an acetoacetate grouping of Formula (2):

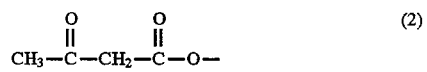

or an acetoacetamide grouping of Formula (3):

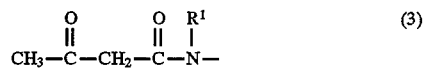

or a 1,3-diketone grouping of Formula (4):

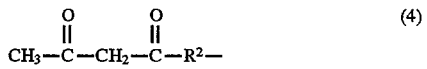

in which R$^1$ is hydrogen or a monovalent hydrocarbyl radical and R$^2$ is a divalent hydrocarbyl radical.

8. Method according to claim 1 wherein the acetoacetyl group is provided by an acetoacetate or acetoacetamide group.

9. Method according to claim 4 wherein the olefinically unsaturated monomer bearing neither tertiary amino nor acetoacetyl groups is selected from the group consisting of olefinically unsaturated mono- and di-carboxylic acids and anhydride, amide and nitrile derivatives thereof, ester derivatives thereof with hydroxyl compounds; dienes; vinylaromatics; vinylhalides; vinylesters; vinylsilanes and vinylheteroaromatics.

10. Method according to claim 1 wherein the olefinic addition polymer includes acid repeat units.

11. Method according to claim 10 wherein the acid repeat unit is provided by incorporating olefinically unsaturated carboxylic acid monomer(s) into the olefinic addition polymer.

12. Method according to claim 1 wherein said dispersion comprises at least one olefinic addition polymer having both polymer bound tertiary amino and polymer bound acetoacetyl groups.

13. Method according to claim 1 wherein said dispersion comprises at least one olefinic addition polymer having polymer bound tertiary amino groups but is free from acetoacetyl groups and at least one olefinic addition polymer having at least one polymer bound acetoacetyl group but is free from tertiary amino groups.

14. Method according to claim 1 wherein said dispersion comprises at least one olefinic addition polymer having both polymer bound tertiary amino and polymer bound acetoacetyl groups and at least one olefinic addition polymer which has polymer bound tertiary amino groups but is free from acetoacetyl groups.

15. Method according to claim 1 wherein said dispersion comprises at least one olefinic addition polymer having both polymer bound tertiary amino and polymer bound acetoacetyl groups and at least one olefinic addition polymer which has polymer bound acetoacetyl groups but is free from tertiary amino groups.

16. Method according to claim 1 wherein in said dispersion of polymer(s) the ratio of acetoacetyl groups to tertiary amino groups is from 1:20 to 6:1.

17. Method according to claim 1 wherein said alkyd-containing coating is a coating made from an alkyd paint.

18. A coated alkyd-containing coating, wherein the coating on said alkyd-containing coating is derived from a coating composition comprising a dispersion in a liquid carrier of at least one olefinic addition polymer, said dispersion of polymer(s) providing polymer bound tertiary amino groups and polymer bound acetoacetyl groups.

19. A coated alkyd-containing coating according to claim 18 wherein said coating composition is as defined in claim 2.

20. A coated alkyd-containing coating according to claim 18 wherein said alkyd-containing coating is a coating made from an alkyd paint.

* * * * *